United States Patent [19]

Ariss et al.

[11] Patent Number: 4,478,868

[45] Date of Patent: Oct. 23, 1984

[54] FROZEN FOOD PRODUCT AND PROCESS FOR PREPARING

[75] Inventors: Stephen A. Ariss; John C. Measures, both of Melton Mowbray; David Barker, Loughborough, all of England

[73] Assignee: Mars Limited, London, England

[21] Appl. No.: 560,959

[22] Filed: Dec. 13, 1983

Related U.S. Application Data

[63] Continuation of Ser. No. 234,853, Feb. 17, 1981, abandoned, which is a continuation of Ser. No. 32,211, Apr. 23, 1979, abandoned.

[30] Foreign Application Priority Data

Apr. 24, 1978 [GB] United Kingdom ............... 16158/78

[51] Int. Cl.$^3$ .......................... A23B 4/06; A23K 1/10; A23L 1/31; A23D 3/36

[52] U.S. Cl. .......................................... 426/641; 62/1; 426/444; 426/524; 426/805

[58] Field of Search ................. 426/66, 327, 332, 574, 426/575, 576, 577, 589, 641, 646, 648, 649, 652, 384, 385, 444, 455, 465, 472, 509, 523, 524, 805, 807, 656, 657, 615; 62/1, 62

[56] References Cited

U.S. PATENT DOCUMENTS

| | | | |
|---|---|---|---|
| 2,278,472 | 4/1942 | Musher | 426/455 X |
| 3,219,461 | 11/1965 | Lamb | 426/524 X |
| 3,676,154 | 7/1972 | Glasser et al. | 426/589 |
| 3,881,032 | 4/1975 | Matsumoto et al. | 426/327 X |
| 3,987,211 | 10/1976 | Dunn et al. | 426/524 X |

FOREIGN PATENT DOCUMENTS

| | | |
|---|---|---|
| 979719 | 12/1975 | Canada . |
| 696049 | 8/1953 | United Kingdom . |
| 1411926 | 10/1975 | United Kingdom . |
| 1506166 | 4/1978 | United Kingdom . |
| 1523591 | 9/1978 | United Kingdom . |

*Primary Examiner*—Arthur L. Corbin
*Attorney, Agent, or Firm*—Davis Hoxie Faithfull & Hapgood

[57] ABSTRACT

A frozen food product which is readily penetratable by thawing water and capable of rapid rehydration comprising a frozen food or mixture of foods having a moisture content which has been adjusted to below that which the food or mixture normally has when ready for consumption. The product contains both frozen and unfrozen water and an added water soluble salt or salts sufficient to maintain unfrozen water in the product. Any individual salt may be present in an amount of up to 4% by weight of the frozen product but the total salt content when more than one salt is present should not exceed 10% by weight of the frozen product. After salt addition the food product is subjected to freezing temperatures to obtain a food product containing both frozen and unfrozen water.

35 Claims, No Drawings

FROZEN FOOD PRODUCT AND PROCESS FOR PREPARING

This is a continuation of application Ser. No. 234,853, filed Feb. 17, 1981, now abandoned, which was a continuation of application Ser. No. 32,211, filed Apr. 23, 1979, now abandoned.

The present invention relates to food products and to processes for their preparation and use. The products may be intended either for human or for animal consumption.

There are already available on the market a considerable number of prepared foods which require relatively little cooking or other treatment to bring them into a condition suitable for consumption. Such products are commonly referred to as "convenience foods".

Known foods of this kind fall generally under three headings—namely canned, dried and frozen products. Each of these types of food, however, has its own problems or disadvantages.

Canned foods are bulky and rely totally on a hermetic seal and thus on the integrity of the can to maintain product quality.

Dry foods tend to show the lowest palatability. In particular, rehydratable dry products tend to be regarded by the consumer as being of low quality and palatability, and a number of technological problems have yet to be overcome. Much work has gone into finding ways of retaining palatability, flavour and texture by reducing the denaturation effects of heat and solute concentration. Although on a laboratory scale some success has been achieved with certain products, major difficulties arise when this work comes to be translated into commercial scale operations.

Although frozen fodds have gained rapidly in sales in the last fifteen years, and more especially the last five years, with a large increase in home freezer ownership, there are still problems associated with their use.

The current frozen food market can be divided into three sectors: (1) Uncooked frozen convenience foods such as blanched vegetables, fish fingers and beefburgers, which do not require thawing before cooking. They do, however, require cooking and, in order that they should not require thawing, they must of necessity be in small pieces or have an artificially induced large surface area, such as boil-in-the-bag foods. The cooking and preparation time of these foods is usually from 5 to 25 minutes. (2) Uncooked frozen bulk foods such as frozen whole chicken or meat joints. These products must be thawed before cooking takes place and the total preparation time can be more than 24 hours. (3) Cooked ready-to-eat foods such as frozen complete meals and roast meat slices. These require heating in a conventional oven for more than 10 minutes or expensive alternatives, such as microwave heating.

All these products show the same major disadvantage. They require extensive thawing and/or cooking to reach a suitable state for consumption.

Apart from the use of freezing in the preservation of foods, it is also known to use a freezing process to concentrate products. The ice formed on freezing a liquid product may be removed from the product, e.g. fruit juice, leaving a product of lower moisture content, which can be reconstituted. The extreme case is the removal of the greater part of the ice under vacuum—the freeze-drying process—which produces instantly rehydratable products, e.g. instant coffee. An essential limitation of freeze-concentration is that it can only be applied to liquids. Freeze-drying can be applied to both solids and liquids, but the resulting products are designed for stability under ambient conditions and, although reconstitution is rapid, such products incorporating solid pieces do not have acceptable palatability or texture.

It is an object of the present invention to provide preserved food products which can be quickly and easily brought into a condition for consumption with acceptable or advantageous organoleptic properties.

This invention provides a frozen food product which is readily penetrable by thawing water comprising a frozen foodstuff or a mixture of foodstuffs having a moisture content below that which said foodstuff or mixture of foodstuffs has when ready for consumption, the product containing both frozen and unfrozen water and also containing at least one physiologically tolerable water soluble salt in an amount sufficient to maintain unfrozen water in the product but not exceeding 4% by weight calculated on the frozen product for any individual salt and not exceeding a total of 10% by weight calculated on the frozen product when more than one salt is present.

The product of this invention is reconstituted by adding warm or hot water in such a quantity that the moisture content of the product is restored to its normal value while at the same time the temperature of the product is raised to its normal value for consumption.

The invention also provides a method of preparing a frozen food product which comprises adjusting the moisture content of a food stuff or mixture of foodstuffs to a level below its normal value in the foodstuff(s), incorporating in the foodstuff(s) before, during or after said adjustment in moisture content at least one physiologically tolerable water soluble salt and freezing said salt containing, moisture depleted foodstuff to produce a frozen product containing both frozen and unfrozen water into which thawing water can readily penetrate, said salt being added in an amount at least sufficient to ensure the presence of unfrozen water in the product but not exceeding 4% by weight of the frozen product for any individual salt and not exceeding a total of 10% by weight of the frozen product when more than one salt is present.

Preferably the moisture content of the foodstuffs is reduced to a level within the range of from 30 to 80%, advantageously 35 to 60% and most preferably 40 to 55% of the original moisture content of the raw, untreated food.

Moisture adjustment may be effected by removing water from fresh foodstuffs or by partially rehydrating a dried, optionally powdered material. This latter method may be used, for example, for producing reconstituted meat-like products from textured vegetable protein.

Products obtained in accordance with the present invention can combine the palatability and texture of frozen foods with the ease of preparation of rehydratable foods. It is possible and highly desirable to achieve both thawing and rehydration in a matter of seconds and certainly within a few minutes.

To achieve the best results, three important factors come into consideration.

First, the frozen product must be porous, or otherwise readily penetrable, so that both thawing and rehydration are rapid and homogeneous. This can be achieved either by manufacturing a product with small particle size or by appropriate treatment of larger pieces with a suitable texture. An important preferred feature of the invention arises from the discovery that chunks or pieces of foodstuff can be used in the product, and that suitably treated, these will also thaw and rehydrate rapidly.

Second, the initial moisture content is so adjusted that when a suitable amount of water of a higher temperature is added to the frozen product to bring it to eating temperature, then the moisture content of the final product is approximately that which would be expected in the unfrozen product. This condition does not set a fixed limit to either the relative quantity or the temperature of the water added at the thawing/rehydration stage. These two factors depend entirely on the type of product. A meat-based product can be so formulated to be consumed at 20°–40° C. by animals or, by reducing its initial water content, by increasing the volume of added water or by increasing temperature of added liquid, to be consumed at 50°–70° C. by humans. It is the total quantity of heat (water temperature × volume) added which is important.

Third, a proportion of the water in the product should remain unfrozen. This amount is controlled by the water-soluble salt components of the product. The aqueous phase of a solution of a given solute in contact with ice at equilibrium is always at the same concentration. Therefore, the greater the quantity of added salt, which will usually be sodium chloride, the greater the amount of water needed to dissolve it (i.e. which will remain unfrozen) at a given temperature below freezing. Control of the amount of frozen water is critical to the final temperature of the product because the latent heat of melting for ice is 80 cal/g, as compared with the specific heat of water of 1 cal/g. Eighty times as much heat is abstracted from the added water to melt each gram of ice as to raise the temperature of the gram of melted ice one degree. The eating temperature of the product can therefore be controlled by this ratio of frozen/unfrozen water in the product. It is possible to calculate a relationship between water content, soluble solids content and amount and temperature of added water for the product which gives a desired eating temperature and concentration.

For example, where the frozen product consists of a grams of unfrozen water (containing a small quantity of soluble food solids), b grams frozen water and c grams food solids and has a temperature of $-K°C.$, and where it is to be raised to a consumption temperature of $+P°C.$ and a final moisture content of W% by the addition of d grams of water initially at $+T°C.$, then, taking the specific heat of the water to be 1, that of ice 0.3 and that of food solids 0.8 and the latent heat of fusion of the ice 80 cal/gram:

$$a(K+P) + b(0.3K + 80 + P) + 0.8c(K+P) = d(T-P) \quad (1)$$

and $$\frac{a+b+d}{a+b+c+d} = 0.01 W \quad (2)$$

Assuming that the final reconstituted product is to contain 1% sodium chloride (a typical value), which is supplied by the salt content of the frozen product, and bearing in mind that the concentration of sodium chloride solution in equilibrium with ice at $-20°$ C. is about 20%, then:

$$a = 0.05(a + b + c + d) \quad (3)$$

Finally, where the result is to be expressed in percentages:

$$a + b + c = 100 \quad (4)$$

As an example of the application of these equations, taking the case of a pet food stored at $-20°$ C. and intended to be reconstituted with boiling water to a desirable moisture content of 80% and salt content of 1% at a temperature for consumption of 30° C., the above equations indicate the following requirements:

| Frozen product: | |
|---|---|
| Food solids | 41.5% |
| Frozen water | 47.9% |
| Unfrozen water | 8.5% |
| Salt | 2.1% |
| Rehydration: | |
| Frozen product at $-20°$ C. | 100 parts |
| Water at 100° C. | 111 parts |

Salts other than sodium chloride can be used, but the weight necessary for the equivalent anti-freeze effect is usually higher. Mono sodium glutamate may, for example, be added as a flavour enhancer, instead of, or in addition, to sodium chloride. The amount of any individual salt added is preferably from 0.5 to 4%, especially 0.5 to 2.5%, by weight calculated on the frozen product and is usually of the order of 2% by weight.

The production of a food product according to the invention requires that the moisture content of a foodstuff be adjusted prior to freezing. Reduction of moisture content can be achieved (a) by drying or (b) by draining out liquor. These different techniques can be illustrated by the following examples of their practice. (a) For a meat product of normal moisture content (75–80%), the meat is cooked or heated until sufficient moisture has been removed to leave a moisture content of 45–50%. After freezing, reconstitution is achieved by addition of a quantity of water equivalent to that evaporated, if the original product is to be exactly reproduced, or a greater amount if, for example, an additional quantity of sauce or gravy is desired.

A similar result can be achieved by starting with a dry or dehydrated material of fibrous texture, for example textured vegetable protein (TVP) or dried meat can be used for this purpose. This material is partially rehydrated (to 35–60% by weight H$_2$O) with water containing some water soluble salt before freezing. The fibrous texture and the inclusion of the water soluble salt component, which leads to a proportion of unfrozen water within the pieces, surprisingly combine to give pieces which thaw and rehydrate within seconds on contact with hot water. In a preferred embodiment this partial rehydration is carried out with liquors, cooked out of the meat components of the product, in which has been dissolved the appropriate quantity of salt. With pieces which are too dry, rehydration occurs too slowly; where they are too wet or without added salt, thawing is not uniform; with larger amounts of salt, the process is technically satisfactory, but the taste of the final product may be unsatisfactory.

As an alternative to partially drying a food product by evaporating water therefrom it is possible to achieve a similar result by bringing the food product into contact with an absorbent material that will abstract the requisite amount of moisture from the food product, and the absorbent material may itself be a food and remain in the final product. This method may be used, for example, when it is necessary that the food product should not be cooked for the long period that may be necessary to evaporate the necessary amount of water from the food product.

(b) After the meat has been cooked, liquors in excess of the required moisture content can be drained or pressed out of the solids. The liquor can be discarded or absorbed into a dry material such that the moisture content of the dry material is increased to the same level as the pressed or drained meat.

In reconstituting food products according to the invention to bring them into a condition for consumption, a quantity of liquid must be added to bring the product to a temperature and moisture content suitable for eating. For a given eating temperature the quantity of added liquid needs to be judged to ±25% to give an acceptable final product for a product of the meat in gravy type. In a domestic situation one would not expect the housespouse to weigh out the liquid onto the product.

A convenient way of measuring out the required quantity of rehydrating liquid for this product provides a preferred feature of this invention. The material is put into a container and just covered with rehydrating liquid. This can readily be judged by eye. For convenience the bulk density of the product can be varied according to the amount of liquid needed to attain a particular final temperature and analysis. Although there are other ways of measuring the amount of rehydrating liquid this appears to be the most convenient. Therefore, the method of the present invention preferably includes the step of adjusting the bulk density of the product so that when placed in a container and just covered with rehydrating liquid the product rehydrates to a moisture content which the foodstuff(s) normally has when ready for consumption. Preferably, the bulk density of the product is such that when placed in a container and just covered with rehydrating liquid the moisture content is raised to the level which the foodstuff normally has when ready for consumption and, even more preferably, the bulk density and moisture content of the product is such that when the rehydrating liquid is at its boiling point the rehydrated foodstuff is at consumption temperature.

The bulk density of the product can be varied or controlled in several ways:

(1) The prefrozen product may be pressed to the correct density before freezing.
(2) Other raw materials of appropriate bulk density may be added to adjust the overall density.
(3) The material may be mechanically treated to decrease the density before freezing, e.g. by emulsification or foaming.
(4) The material may be mechanically treated as it is freezing, e.g. by whipping.
(5) The material may be mechanically treated after freezing, e.g. by grinding to reduce the bulk density.

The following illustrative Examples of the invention are given by way of example only. All parts and percentages are by weight unless the context indicates otherwise.

EXAMPLE 1

Animal Food

Meat offal was minced through a 1 cm mincer plate and cooked at 100° C. for 10 minutes. On heating, meat liquor cooks out of the meat. The meats were separated from the liquors and pressed to remove more liquor so that the moisture content of the pressed meat was about 50-60%.

95.2 parts of pressed meat were minced with 2 parts salt, 2 parts of carboxymethylcellulose (CMC) and 0.8 parts of caramel. The ingredients were tightly pressed to a bulk density of about 0.5 g/ml and frozen at a temperature of −20° C. in a domestic deep freezer.

This frozen product, when mixed with enough boiling water just to cover the product, thawed and rehydrated within 30 seconds to give a final temperature of 33° C. and a moisture content of 75%. The reconstituted product consisted of meat in thickened gravy and had a glossy appearance. It was highly acceptable to cats and dogs.

EXAMPLE 2

Animal Food

Cooked minced meat offal was prepared as in Example 1 and pressed to remove excess liquors. 93.2 parts of this were mixed with 2 parts salt, 4 parts pregelatinized starch (Instant Cleargel-Trade Mark), and 0.8 parts caramel. This was prepared as in Example 1.

On rehydration with enough boiling water just to cover the frozen product, this formulation gave a final product with thickened gravy of glossy appearance at a temperature of 30° C.

EXAMPLE 3

Animal Food

Pressed meats were prepared as in Example 1. 95.8 parts of this were used with 2 parts salt, 0.8 parts carob, 0.6 parts xanthan and 0.8 parts caramel. This was prepared as in Example 1.

On rehydration with boiling water, thickening of the gravy was slower than in Example 1 and 2, but within one minute a reconstituted product with a glossy gel at a temperature of 30° C. was obtained.

EXAMPLE 4

Animal Food

Pressed meats were prepared as in Example 1 and 92.2 parts were mixed with 4 parts of alginate (Manugel GHB-Trade Mark), 1 part dicalcium phosphate, 2 parts salt and 0.8 parts of caramel. This was frozen as in Example 1 and when reconstituted as in Example 1 gave a final product with a dull gel.

EXAMPLE 5

Animal Food

This Example uses as gelling agent a crude pectinaceous material (citrus peel), the pectin content of which has been de-esterified to a degree of esterification below 20% ("treated peel").

Pressed meats were prepared as in Example 1, and 92.2 parts were mixed with 4 parts of treated peel, 1 part dicalcium phosphate, 2 parts salt and 0.8 parts of caramel. This was frozen as in Example 1 and when reconstituted as in Example 1 gave a final product with a dull gel.

These first five Examples have involved discarding the cookout liquors from the meat. As a first step to preserving this valuable byproduct an alternative method of removing moisture from the meat can be used.

EXAMPLES 6 TO 10

Animal Food

Meat offal was minced through a 1 cm mincer plate and cooked at 100° C. until most of the liquor which had cooked out of the meat was reduced. This meat was then placed in a heated air oven at 100° C. on a tray and left until the moisture content was reduced to approximately 50%. This process retains the water soluble components of the liquor while the actual moisture content is reduced.

This dried meat can then be treated in exactly the same way as the pressed meats in Examples 1 to 5 (Examples 6 to 10 respectively in Table I) to give equally acceptable products.

TABLE I

| Example: | 6 | 7 | 8 | 9 | 10 | |
|---|---|---|---|---|---|---|
| Dried meat | 95.2 | 93.2 | 95.8 | 92.2 | 92.2 | (parts) |
| Salt | 2 | 2 | 2 | 2 | 2 | |
| Caramel | 0.8 | 0.8 | 0.8 | 0.8 | 0.8 | |
| CMC | 2 | — | — | — | — | |
| Starch | — | 4 | — | — | — | |
| Carob | — | — | 0.8 | — | — | |
| Xanthan | — | — | 0.6 | — | — | |
| Alginate | — | — | — | 4 | — | |
| Treated peel | — | — | — | — | 4 | |
| Dicalcium phosphate | — | — | — | 1 | 1 | |

Instead of the moisture content being reduced by evaporation, an alternative is to add dry ingredients which reduce the overall moisture content, as shown in the following Examples 11 and 12.

EXAMPLE 11

Animal Food

The meat offal as previously described was cooked at 100° C. for 10 minutes. Low moisture content ingredients were then mixed with the meat cookout liquors to reduce the overall moisture content to 50%. A suitable formulation is:

| Minced meats | 55 parts |
|---|---|
| Potato protein | 5 parts |
| Biscuit | 5 parts |
| TVP | 5 parts |
| Greaves, dry | 10 parts |
| Meat and bone meal | 5 parts |
| NaCl | 2 parts |
| Tallow | 3 parts |
| Caramel | 0.1 part |
| Xanthan | 0.6 part |
| Carob | 0.8 part |
| Dried decolourised blood | 8.5 parts |

The mix should be agitated during freezing or milled after freezing to avoid the formation of solid frozen pieces which will not readily thaw.

EXAMPLE 12

Animal Food

Meats were cooked as in Example 1 and from that process the cookout meat liquors were saved. 87 parts of these liquors were mixed with 13 parts of wheat flour, and the resultant dough was roller dried and ground to a powder. By this means the liquors and their flavours and nutrients are saved and, at the same time, the starches in the flour are gelled, thus removing any need for the addition in the final formula of a pre-gelled starch.

The final formulation for this example was 78.8 parts of cooked pressed meats, with 19 parts of roller-dried dough of flour and cookout liquors, 2 parts salt and 0.2 part caramel. This mix was frozen according to the instructions in Example 1.

Other suitable binding agents for the cookout liquors, which may be incorporated prior to roller drying, include soya meal and gluten. However, the addition of a gelling agent in the final formulation is desirable when these ingredients are used.

However, a particularly preferred embodiment of this invention is based upon the use of meat cookout or press liquors to partially rehydrate TVP. This is exemplified in Example 13.

EXAMPLE 13

Animal Food

Meats were cooked and pressed as in Example 1. In the liquors were dissolved salt and caramel. An equal weight of dry TVP was added to the liquors and the whole agitated until the TVP had taken up the liquid. This partially rehydrated TVP was then mixed with the pressed meats. The amount of salt and caramel added were such as to produce concentrations of 2% and 0.8% respectively in the frozen product.

This mixture can then be frozen as in Example 1 and on thawing and rehydration gives a chunky product of good appearance. The liquors are leached out of the TVP by the liquid added to thaw the product. However, if it is required to form a gravy, the pressed meat and TVP can be coated with the thickening agents as in Examples 1 to 5, simply by agitating with a powder mix of these agents.

It is also possible to combine the technologies of Examples 12 and 13, as shown in Example 14.

EXAMPLE 14

Animal Food

In this case part of the liquors pressed out of the meats were used to manufacture TVP. A formulation for a vegetable protein dough is:

| Liquors | 30 parts |
|---|---|
| Defatted soya flour | 60 parts |
| Maize meal | 10 parts |
| Sulphur | 0.02 parts |

This dough was extruded from a cooker-extruder at 150° C. After being cooled the resulting TVP was combined with the remainder of the liquors to give a partially rehydrated TVP which could be used as in Example 13.

The principles of this invention are not limited to the preparation of animal foods. It is also possible to manufacture human food formulations, as exemplified in Example 15.

EXAMPLE 15

Human Food

Braising steak was minced through a 1 cm mincer plate and cooked at 100° C. for 10 minutes. Liquors were pressed out of the cooked meat as in Example 1, and to these salt and caramel were added as in Example 13. These liquors were then used to partially rehydrate TVP (Bontrae 7240-Trade Mark) and thereafter the product was treated as in Example 13. On rehydration the product had a pleasant beefy aroma and had the appearance of Chow Mein because of the texture of the TVP. Furthermore, since Bontrae is a very absorbent form of TVP, more hot liquor can be added so that the eating temperature can be close to 70°–80° C., without giving excess gravy.

We claim:

1. The method of making a frozen food product possessing a quick thaw capability in hot water which includes the steps, prior to freezing, of adjusting the moisture content of the unfrozen food to lower than normal, applying a physiologically tolerable salt or salts to the food in an amount, based on the weight of the product as subsequently frozen, not exceeding 4 percent for any individual salt and 10 percent for a plurality of salts, and thereafter subjecting the food to a freezing temperature such that its water content is partially frozen and partially unfrozen by virtue of the presence of said salt.

2. A method as claimed in claim 1 wherein the moisture content of the frozen food is 30 to 80% of the original moisture content.

3. The method of treating a food product to facilitate its preparation for serving after having been frozen for storage which includes the steps, prior to freezing, of adjusting the moisture content of the unfrozen food to lower than normal, applying a physiologically tolerable salt or salts to the food in an amount, based on the weight of the product as subsequently frozen, not exceeding 4 percent for any individual salt and 10 percent for a plurality of salts, subsequently subjecting the food to freezing at a temperature at which its water content is partially frozen and partially unfrozen by virtue of the presence of said salt, and thereafter, prior to serving, treating the frozen product with a predetermined quantity of hot water to thaw the product quickly and bring it to eating temperature and simultaneously to restore its moisture content to approximately normal.

4. A method as claimed in claim 3, wherein the moisture content is 35 to 60% of the original moisture content.

5. A method as claimed in claim 3, wherein the moisture content is 40 to 55% of the original moisture content.

6. A method as claimed in any of claims 1, 3, 2, 4, or 5 wherein adjustment of the moisture content is achieved by reducing the moisture content of fresh food.

7. A method as claimed in claim 6, wherein the moisture content is reduced by drying the food.

8. A method as claimed in claim 7, wherein drying is effected by evaporating moisture from the food.

9. A method as claimed in claim 8 which includes the step of adjusting the bulk density of the product so that when placed in a container and just covered with rehydrating liquid the product rehydrates to a moisture content which the food normally has when ready for consumption.

10. A method as claimed in claim 7, wherein drying is effected by contacting the food with an absorbent material to abstract moisture from the product.

11. A method as claimed in claim 10, wherein the absorbent material is itself a food and remains in the final product.

12. A method as claimed in claim 11 which includes the step of adjusting the bulk density of the product so that when placed in a container and just covered with rehydrating liquid the product rehydrates to a moisture content which the food normally has when ready for consumption.

13. A method as claimed in claim 10 which includes the step of adjusting the bulk density of the product so that when placed in a container and just covered with rehydrating liquid the product rehydrates to a moisture content which the food normally has when ready for consumption.

14. A method as claimed in claim 7 which includes the step of adjusting the bulk density of the product so that when placed in a container and just covered with rehydrating liquid the product rehydrates to a moisture content which the food normally has when ready for consumption.

15. A method as claimed in claim 6, wherein the moisture content is reduced by draining moisture from the food.

16. A method as claimed in claim 15, which comprises cooking the food and draining or pressing excess liquors from the cooked food.

17. A method as claimed in claim 15 which includes the step of adjusting the bulk density of the product so that when placed in a container and just covered with rehydrating liquid the product rehydrates to a moisture content which the food normally has when ready for consumption.

18. A method as claimed in claim 6 which includes the step of adjusting the bulk density of the product so that when placed in a container and just covered with rehydrating liquid the product rehydrates to a moisture content which the food normally has when ready for consumption.

19. A method as claimed in any of claims 1, 3, 2, 4 or 5 wherein adjustment of the moisture content is achieved by partially rehydrating dried food.

20. A method as claimed in claim 19 which includes the step of adjusting the bulk density of the product so that when placed in a container and just covered with rehydrating liquid the product rehydrates to a moisture content which the food normally has when ready for consumption.

21. A method as claimed in any of claims 1, 3 2 or 5 which includes the step of adjusting the bulk density of the product so that when placed in a container and just covered with rehydrating liquid the product rehydrates to a moisture content which the food normally has when ready for consumption.

22. A frozen food product possessing a quick thaw capability in hot water, said product having a lower than normal moisture content to enhance its absorptivity of rehydrating water and having dissolved therein physiologically tolerable salt so that the water content of said product is partially frozen and partially unfrozen whereby absorption of hot rehydrating water quickly raises the product temperature by heating the unfrozen water while thawing the frozen water thereby producing food that is warmed, thawed and brought to substantially normal moisture content by brief hot water treatment preparatory to serving.

23. A frozen food product as claimed in claim 22, containing from 0.5 to 4% by weight of any individual salt.

24. A frozen food product as claimed in claim 23, wherein the amount of any individual salt is substantially 2% by weight.

25. A frozen food product as claimed in any of claims 22, 23 or 24, wherein the salt is sodium chloride.

26. A frozen food product as claimed in claim 25, wherein the moisture content is within the range of from 30 to 80% of the original moisture content of the raw untreated food.

27. A frozen food product as claimed in claim 26, wherein the moisture content is within the range of from 35 to 60% of the original moisture content of the raw untreated food.

28. A frozen food product as claimed in claim 27, wherein the bulk density of the product is such that when placed in a container and just covered with rehydrating liquid the moisture content is raised to the level which the food normally has when ready for consumption.

29. A frozen food product as claimed in claim 26, wherein the moisture content is within the range of from 40 to 55% of the original moisture content of the raw untreated food.

30. A frozen food product as claimed in claim 29, wherein the bulk density of the product is such that when placed in a container and just covered with rehydrating liquid the moisture content is raised to the level which the food normally has when ready for consumption.

31. A frozen food product as claimed in claim 26, wherein the bulk density of the product is such that when placed in a container and just covered with rehydrating liquid the moisture content is raised to the level which the food normally has when ready for consumption.

32. A frozen food product as claimed in claim 25, wherein the bulk density of the product is such that when placed in a container and just covered with rehydrating liquid the moisture content is raised to the level which the food normally has when ready for consumption.

33. A frozen food product as claimed in any of claims 22, 23, or 24, wherein the bulk density of the product is such that when placed in a container and just covered with rehydrating liquid the moisture content is raised to the level which the food normally has when ready for consumption.

34. A frozen food product as claimed in claim 33, wherein the bulk density and moisture content of the product is such that when the rehydrating liquid is at boiling point the rehydrated food is at consumption temperature.

35. A frozen food product as claimed in any of claims 22, 23 or 24, wherein the moisture content is within the range of from 30 to 80% of the original moisture content of the raw untreated food.

* * * * *